United States Patent [19]

Brooks et al.

[11] Patent Number: 5,276,577
[45] Date of Patent: Jan. 4, 1994

[54] HEAD-DISK ENCLOSURE SEAL FOR MAGNETIC DISK STORAGE DEVICE

[75] Inventors: Peter E. Brooks; James M. Rigotti, both of Rochester, Minn.

[73] Assignee: International Business Machines Corporation, Armonk, N.Y.

[21] Appl. No.: 725,948

[22] Filed: Jun. 27, 1991

Related U.S. Application Data

[63] Continuation of Ser. No. 629,048, Dec. 14, 1990, abandoned, which is a continuation of Ser. No. 338,920, Apr. 17, 1989, abandoned.

[51] Int. Cl.[5] .................. G11B 33/14; G11B 17/02
[52] U.S. Cl. .................. 360/97.02; 360/97.01; 360/900
[58] Field of Search ........... 360/97.01, 97.02, 97.03, 360/98.01, 86; 428/343

[56] References Cited

U.S. PATENT DOCUMENTS

| | | | |
|---|---|---|---|
| 3,505,144 | 4/1970 | Kilduff et al. | 428/343 |
| 3,601,555 | 8/1971 | Peterson | 360/132 |
| 3,601,556 | 8/1971 | Cooper, Jr. et al. | 360/72.2 |
| 3,967,068 | 6/1976 | Shinohara | 360/106 |
| 4,011,358 | 3/1977 | Roelofs | 360/134 |
| 4,092,687 | 5/1978 | Butsch | 360/97.02 |
| 4,098,945 | 7/1978 | Oehmke | 428/343 |
| 4,658,956 | 4/1987 | Takeda et al. | 360/33.1 |
| 4,669,004 | 5/1987 | Moon et al. | 360/77.08 |
| 4,751,594 | 6/1988 | Blanks | 360/97.02 |
| 4,759,981 | 7/1988 | Weil | 428/343 |
| 4,783,705 | 11/1988 | Moon et al. | 360/77.08 |
| 4,839,227 | 6/1989 | Hoopman | 428/343 |
| 4,864,351 | 9/1989 | Imai et al. | 360/128 |
| 5,021,905 | 6/1991 | Sleger | 360/97.01 |
| 5,038,239 | 8/1991 | Vettel et al. | 360/98.01 |
| 5,060,095 | 10/1991 | Rigotti et al. | 360/97.03 |
| 5,097,978 | 3/1992 | Eckerd | 360/132 |

OTHER PUBLICATIONS

"Heat Shrink Head/Disk Enclosure Seal", Research Disclosure, Jul. 1986, No. 267, Kenneth Mason Publications Ltd, England.

Primary Examiner—Stuart S. Levy
Assistant Examiner—Craig A. Renner
Attorney, Agent, or Firm—Robert W. Lahtinen; Richard E. Billion; Roy W. Truelson

[57] ABSTRACT

A disk drive includes a cast base upon which is mounted the disk stack-spindle assembly and the actuator assembly and a cover that is loosely received by the cast base to form the head-disk enclosure. The cover is secured and sealed to the cast base by a malleable metal foil tape that surrounds the enclosure and continuously overlies the interface between cover and base. The tape complies with the surface irregularities and does not creep, to provide permanent shielding and sealing between base and cover. Further, cables exiting the enclosure may be sealed using a piece of double sided adhesive which is interposed between cable and casting followed by application of the malleable foil tape thereover. Thus in a compact device, no significant thickness is added to the enclosure wherein a maximum available height is used to house the stack of disks while providing noise and EMC shielding in addition to securing and sealing the cover.

3 Claims, 4 Drawing Sheets the # HEAD-DISK ENCLOSURE SEAL FOR MAGNETIC DISK STORAGE DEVICE

CROSS REFERENCE TO RELATED APPLICATION

This application is a continuation of applicant's prior co-pending application, Ser. No. 07/629,048, filed Dec. 14, 1990, now abandoned; which is a continuation of co-pending application Ser. No. 388,920 filed on Apr. 17, 1989 now abandoned.

FIELD OF THE INVENTION

The invention pertains to rigid magnetic disk storage devices and more particularly to means for sealing and shielding head-disk enclosures for such devices.

BACKGROUND OF THE INVENTION

To maintain the required clean environment within the head-disk enclosure of a magnetic disk storage device it is necessary that all interfaces between components forming the enclosure be sealed. As the effort is made to maximize the volumetric density of a magnetic disk drive, it is necessary to place as many disks as possible on a spindle. This reduces the space available to seal the unit using the heretofore conventional methods including elastomeric gaskets with clamping devices and providing for cable exits. Providing the sealing, shielding and retaining function while occupying a minimum of space is mandatory, but even more important, the system used to seal the device must not impose forces on the enclosure components that create even minute distortions.

Construction of a disk drive requires that the unit must be sealed and pressure tested as a part of the build process. Drives that utilize large rubber cover gaskets normally pinch flex cables between the gasket and the corresponding sealing surface. Any alternative sealing and retaining system must also accommodate cable exits for the sealed enclosure.

SUMMARY OF THE INVENTION

To attain increased volumetric density of a drive having an enclosure including a base casting and a drawn metal cover the sealing system was reduced to a tape that is wrapped about the junction of the cover and base casting. However, problems are encountered with this solution. Most tapes are composed of pressure sensitive adhesives attached to elastomeric backers. These adhesives tend to be sensitive to creep. When the tape is applied to a discontinuity, including a lap joint upon itself, the elastomer backer applies a constant tensile load. This load causes the adhesive to fail in creep and the tape to pull away from the joint. A gap is produced which allows air leakage into the enclosure. Further, elastomeric tapes are poor conductors of electrical currents. The nonconductive gaps bridged by the seal are areas of electromagnetic noise leakage into the enclosure. This noise interferes with the ability of the file to read.

To obtain the space saving benefits of tape sealing and retention of the enclosure elements, the disk drive seal is comprised of a compliant metallic backer with a conductive pressure sensitive adhesive. When the tape is applied to a discontinuity, the malleable backer conforms, leaving very little load on the adhesive to thereby preserve the integrity of the seal over time. The conductive nature of the tape and adhesive provide electromagnetic compatibility (EMC) protection.

To accommodate exit cables, a length of double sided adhesive is applied to the cover adjacent to the flex cable exit. The flex cable is the folded down to be adhered to the upper surface of the double sided adhesive to form an air tight seal between the cover and the lower surface of the flex cable. As the compliant metal foil backed tape is applied over the junction between base and cover and over the double sided adhesive, the cover is sealed to the base and the sealed integrity is also established with respect to the cable exiting from the enclosure.

DETAILED DESCRIPTION

Figure 1:
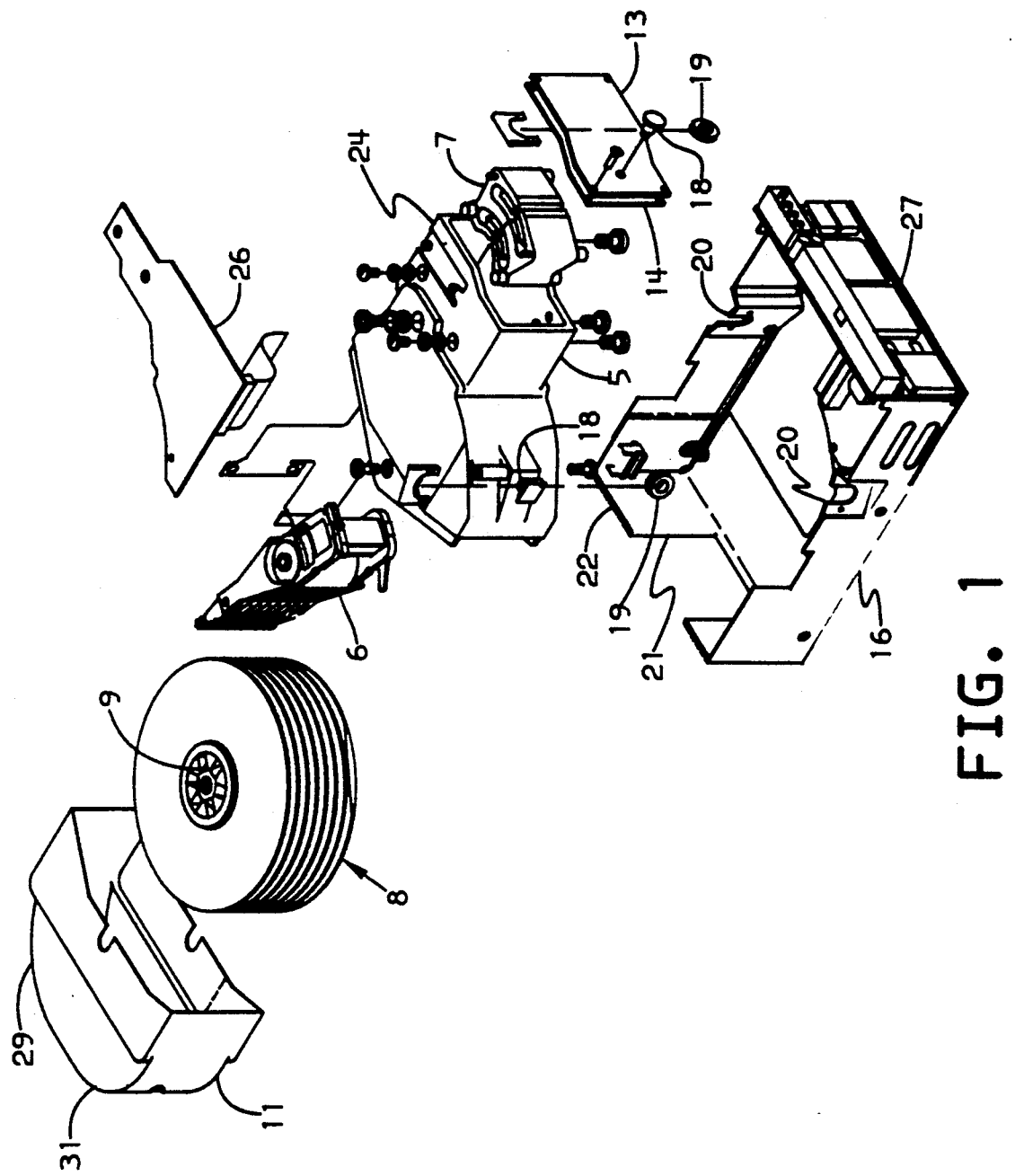
FIG. 1 is an exploded view of a rigid magnetic disk drive illustrating the principal components.

FIG. 1 illustrates a disk drive wherein a base casting 5 supports a rotary actuator 6, the cooperating magnet-pole piece assembly 7 and the spindle assembly 8 which includes the disk stack and a concentrically mounted motor within hub 9. At the end of casting 5 from which the disks protrude, the enclosure is completed by a drawn metal cover 11 and at the end adjoining the voice coil motor magnet assembly 7, a cover 13 and a gasket 14 complete the head-disk enclosure. The enclosure is effectively sealed with the exception of a breather filter (not shown) which is provided to allow equalization of pressure differences resulting from thermal change or variations in atmospheric pressure. The conventional practice is to place the breather filter to access the location of lowest pressure within the head-disk enclosure to assure that any undesired leakage through a gasket or otherwise is out of the enclosure with the result that only air filtered through the breather filter enters the enclosure. The head-disk assembly is shock mounted in a frame 16 by three projections 18 that are respectively surrounded by elastomer elements 19 and received in three respective slotted openings 20. The compactness of the drive design may be appreciated by the fact that the frame 16 has a cutout portion 21 in the end wall 22 to accommodate the end of the head-disk enclosure cover 11 and a reduced height at both the top and bottom of casting portion 24, that surrounds the actuator voice coil motor, to enable upper and lower circuit cards 26, 27 to extend the full width of the frame 16. Cover 11 bas a substantially cylindrical side wall portion 24, which closely confines the disk stack and a more deeply drawn side wall portion 31 which receives and supports a recirculating filter cartridge.

Figure 2:
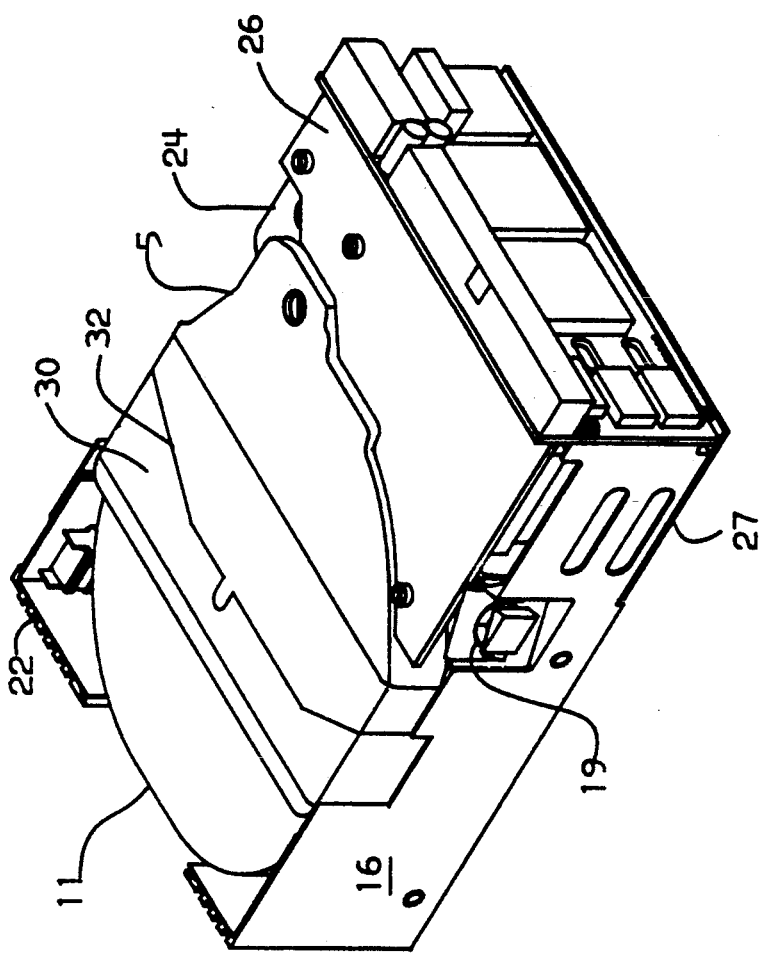
FIG. 2 is an isometric view of the disk drive of FIG. 1 assembled and including the tape that encloses, seals and shields head-disk assembly.

FIG. 2 illustrates the disk drive of FIG.1 in the assembled condition with the cover 11 sealed to the base casting 5 by a length of tape 30 that surrounds the assembly and continuously overlies the parting line 32 between cover and base casting. The tape 30 as shown in FIG. 2 is a continuous length of tape that surrounds the head disk enclosure to continuously overlie the junction 32 between the base and cover. However, because of the nonelasticity and compliance capability of the malleable metal foil tape, it would be possible to use more than a single length of tape to perform the sealing without compromising the effectiveness of the seal.

Tape 30 is a metal foil which carries an adhesive. The metal foil is malleable or dead soft such that it possesses no elasticity or memory that would tend to restore the material to or approaching an original condition. The elasticity of normal tapes causes a tensile force to be present when the tape is stressed, resulting in creep that often causes fail-Lire of the seal where the tape extends over a discontinuity. The malleable foil tape conforms to the surface to which it is applied and permanently deforms to maintain permanent intimate contact. A typical metal foil tape is a two thousandths inch copper foil which carries an adhesive of one or two thousandths inch thickness. The metal foil maintains intimate contact with each of the surface irregularities as indicated in FIG. 2 by the visibility of the parting line 32 where cover 11 and the cast base 5 adjoin. The most critical locations regarding the the seal effected by the tape are inside curves where an elastic tape would tend to restore, pull away over time and break the continuity of the seal. Such inside curved surfaces can be largely avoided through the design of the structure, however, some occurrences cannot be avoided, such as at the location where the tape ends overlap and where cables extend through the taped seal as shown hereafter. The foil component of the tape provides a conductive shield that covers as well as shields nonconductive gaps bridged by the tape to prevent electromagnetic noise leakage into the enclosure that would interfere with the read function while also providing EMC protection.

Figure 3:
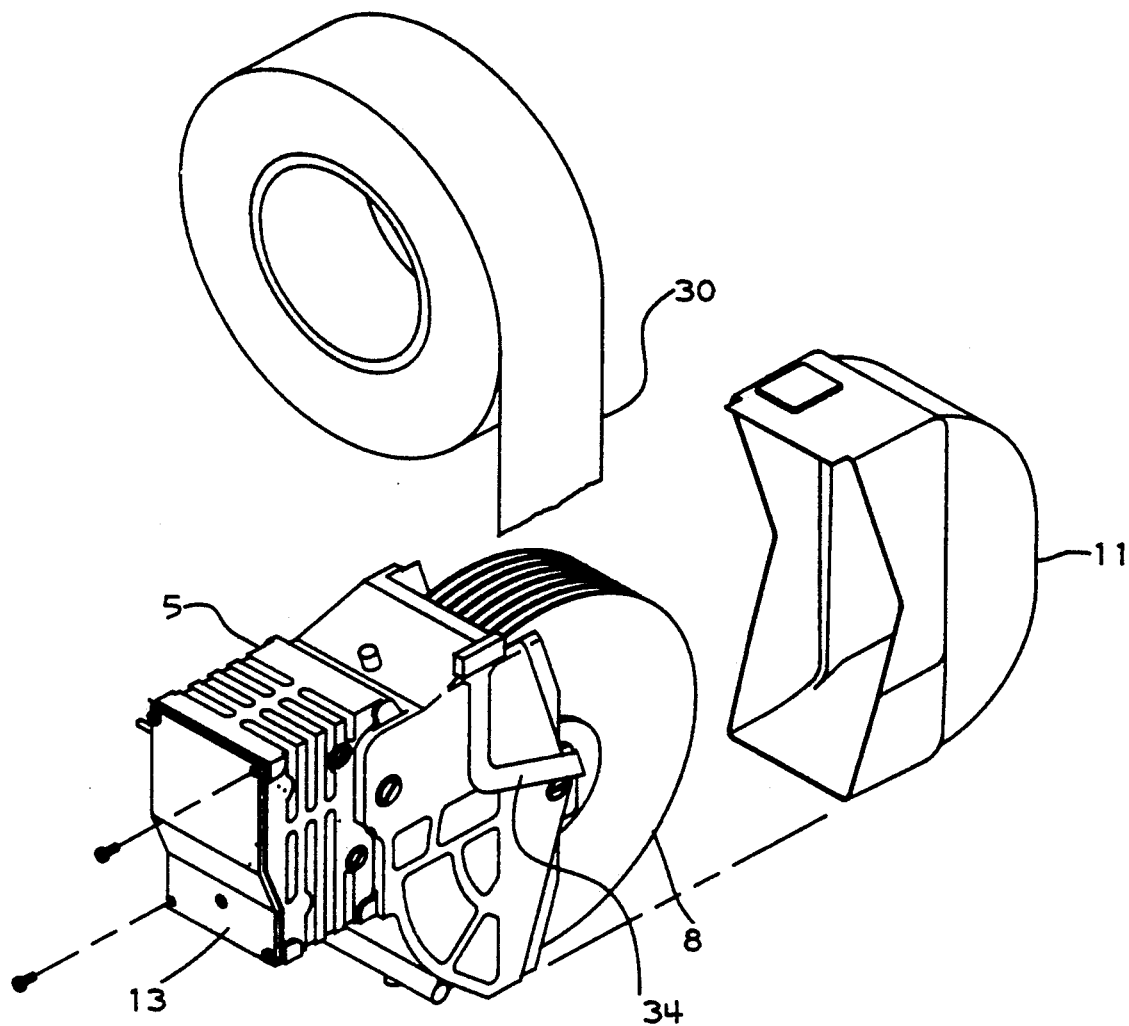
FIG. 3 shows the head-disk enclosure of FIGS. 1 and 2 with the cover removed, a flat flexible cable that extends from the enclosure and a roll of sealing tape.

FIG. 3 illustrates the head-disk assembly with the cover 11 removed and a roll of sealing tape. The tape can be dispensed from a roll or may be precut to the desired length. The tape may be precut to desired configuration as well as length and where significant deformity is to occur it may be deformed to comply with such structural irregularity. Also shown is a flat cable 34 that communicates with the spindle motor circuitry. Cable 34 must extend from the spindle motor to a connector outside the enclosure without compromising the seal. This is accomplished using the technique illustrated in FIGS. 4A through 4C.

Figure 4A:
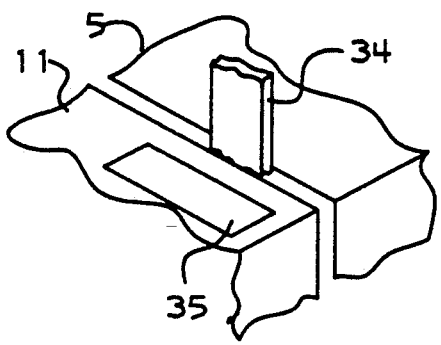
FIGS. 4A, 4B and 4C illustrate the technique for sealing a flat cable extending from the head-disk enclosure through the interface between the base casting and the cover.
Figure 4B:
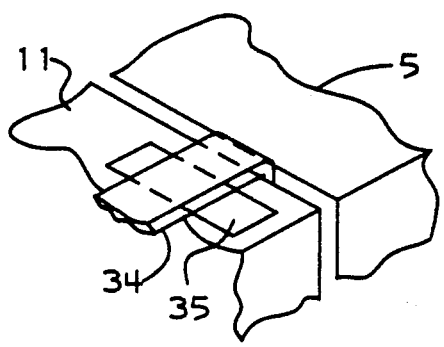
Figure 4C:
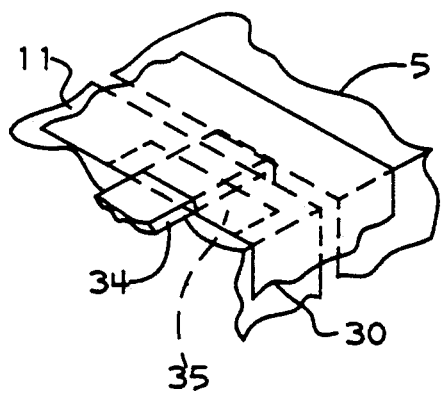

As seen in FIG. 4A, the cable 34 extends from the spindle motor that is concentrically mounted within the disks of the spindle assembly 8 (FIG. 1). Spindle assembly 8 is supported on the cast base 5 and the cable 34 is folded back over the base. A piece of double sided adhesive 35 is adhered to the cover 11 and the cable 34 is folded against the upper adhesive si,? ,face as shown in FIG. 4B. Thereafter, the metal foil sealing tape is applied as illustrated in FIG. 4C to wholly overlie the piece of double sided adhesive 35. Care is also taken to position the tape in the inside curves that occur at each side of the cable 34 and adhesive 35.

The adhesive carried by tape 30 may be either conductive or nonconductive. Although a conductive adhesive assures the electrically conductive continuity of the enclosure, the malleable metal foil of the tape so closely conforms to the parts and any surface irregularities that electrical shielding and conductive continuity are successfully achieved even with the use of a nonconductive adhesive.

While the invention has been particularly shown and described with reference to a preferred embodiment thereof, it will be understood by those skilled in the art that various changes in the form and details may be made therein without departing from the spirit and scope of the invention.

What is claimed is:

1. A magnetic disk drive enclosure having an inside and an exterior, said enclosure housing a head-disk assembly in a substantially sealed clean environment comprising:

first and second enclosure portions that adjoin one another and cooperate to surround said head-disk assembly;

means for aligning said first and second enclosure portions;

an enclosure sealing system including a compliant, malleable, metallic foil tape continuously overlying the junction between said first and second enclosure portions and secured thereto by an electrically conductive, pressure sensitive adhesive to maintain alignment and positioning between said first and second enclosure portions;

a conductor extending from the head-disk assembly inside the enclosure to the exterior of the enclosure at the junction between said first and second enclosure portions; and a double sided adhesive applied to one of said first and second enclosure portions adjacent where said conductor emerges from the inside of the enclosure, the double sided adhesive positioned between the conductor and said one of said first and second enclosure portions and said compliant, malleable, metallic foil tape overlies said conductor and said double sided adhesive.

2. The magnetic disk drive enclosure of claim 1 wherein said conductor is a flexible flat cable member.

3. The magnetic disk drive enclosure of claim 2 wherein said compliant, malleable, metallic foil tape is a single continuous strip overlying the junction between said first and second enclosure portions, said compliant, malleable, metallic foil tape having two ends, the two ends thereof overlapped.

* * * * *